(12) United States Patent
Sarkki et al.

(10) Patent No.: US 6,373,933 B1
(45) Date of Patent: Apr. 16, 2002

(54) METHOD FOR IMPLEMENTING TRANSACTION-BASED BILLING FOR TELEPHONE SERVICES

(75) Inventors: Mika Sarkki, Vantaa; Jukka Airaksinen; Martti Kosonen, both of Helsinki; Jorma Jaakkola, Vantaa, all of (FI)

(73) Assignee: Sonera Oyj, Helsinki (FI)

( * ) Notice: Subject to any disclaimer, the term of this patent is extended or adjusted under 35 U.S.C. 154(b) by 0 days.

(21) Appl. No.: 09/544,156

(22) Filed: Apr. 6, 2000

(30) Foreign Application Priority Data

Oct. 6, 1997 (FI) .................................. PCT/FI97/00601

(51) Int. Cl.$^7$ ............................................. H04M 15/00
(52) U.S. Cl. ............. 379/126; 379/127.01; 379/114.05; 455/466
(58) Field of Search ................................ 379/112, 113, 379/115, 120, 229, 230, 114.01, 114.05, 114.25, 88.18, 201.01, 201.05, 207.02, 126; 455/6.3, 466

(56) References Cited

U.S. PATENT DOCUMENTS

| | | | | |
|---|---|---|---|---|
| 5,742,905 A | * | 4/1998 | Pepe et al. ................. | 379/210 |
| 5,845,211 A | * | 12/1998 | Roach, Jr. .................... | 455/436 |
| 5,956,391 A | * | 9/1999 | Melen et al. ................ | 379/114 |
| 6,141,404 A | * | 10/2000 | Westerlage et al. ......... | 379/118 |
| 6,181,935 B1 | * | 1/2001 | Gossman et al. ............ | 455/433 |
| 6,201,861 B1 | * | 3/2001 | Mika ........................... | 379/207 |
| 6,226,373 B1 | * | 5/2001 | Zhu et al. .................... | 379/207 |

FOREIGN PATENT DOCUMENTS

| | | |
|---|---|---|
| DE | 44 12 727 A1 | 10/1995 |
| EP | 0 698 987 A2 | 2/1996 |
| EP | 0 779 733 A2 | 6/1997 |
| WO | WO 97/30543 | 8/1997 |

* cited by examiner

Primary Examiner—Curtis Kuntz
Assistant Examiner—Rexford Barnie
(74) Attorney, Agent, or Firm—Cohen, Pontani, Lieberman & Pavane

(57) ABSTRACT

In the inventive procedure for implementing event-based billing in conjunction with services provided for consumers via a telephone connection in a telecommunication system, a connection is set up between a consumer's terminal device and an intelligent peripheral, a service is selected in the peripheral by means of the terminal device, an assessment request based on the selected service is sent from the peripheral to a service control point and, based on the assessment requests sent by the peripheral, an event-based bill for the customer is produced.

8 Claims, 2 Drawing Sheets

METHOD FOR IMPLEMENTING TRANSACTION-BASED BILLING FOR TELEPHONE SERVICES

BACKGROUND OF THE INVENTION

1. Field of the Invention

The present invention relates to telephony. In particular, the present invention is directed to a procedure for implementing event-based billing for and in conjunction with services provided to consumers via terminal equipment, such as a telephone.

2. Description of the Related Art

At present, teleoperators—i.e. those who operate and maintain telecommunication networks and systems for use by system subscribers or users—provide a variety of services that are available to users of the network by telephone. Teleoperators may also sell or rent systems for use by outside service providers to provide such services, to organize and conduct polls by telephone, or to carry out other corresponding kinds of operation via telephonic communication.

A significant problem with current implementations is that a separate telephone number is needed for each differently-priced service and event. Therefore, in order to provide telephonic services, a multiplicity of distinct telephone numbers must be maintained and advertised, resulting in complex and confusing advertisements. Another problem with current systems is that after receiving one service, i.e. after a customer has called a service number and ordered or received a desired service, the customer needs to hang up and make another, separate call to the same or another service number to obtain or use a different service—even if the customer wishes to purchase additional services during the same call.

A practical example of this problem arises in a short-message sales service in which, upon receipt of an order from a customer, short messages containing for example weather information, news, ticket information, etc. can be sent to a terminal device selected by the customer. In the framework of currently-implemented technology, the customer can order a single predetermined message by calling a so-called intelligent network number, all calls to which are charged to the customer at a rate defined for this particular use, and the customer being billed at that rate for each call made to the intelligent network number. As a consequence, a separate intelligent network number must be provided for, by way of example, each differently-priced weather information message. Moreover, the customer can be charged only once, i.e. for only a single message transmission request, during each call.

SUMMARY OF THE INVENTION

It is accordingly the desideratum of the present invention to eliminate the drawbacks and deficiencies of the prior art, as for example described hereinabove.

It is a specific object of the invention is to provide a procedure that allows intelligent event-based payment for services implemented by means of telecommunication network components.

It is a further object of the invention to provide such a system in which a customer can order or purchase and be charged for a plurality of services by calling and during a telecommunications connection via a single telephone number.

In the inventive procedure for implementing event-based billing of services provided via a telecommunication network, a service is ordered by a customer using a terminal device, such for example as a wired or wireless telephone, via the telecommunication network. The telecommunication network preferably comprises an intelligent network that typically includes a service control point (SCP), a service switching point (SSP) and/or an intelligent peripheral (IP), and a number of telephone exchanges as well as the data transmission channels between and connecting them. As used herein, an intelligent peripheral (IP) is a device that, in a preferred form, can be remotely controlled—e.g. through the use of user-selected of tone frequency tones of a telephone—to cause it to carry out desired functions and which may be provided with a vocalized menu or the like to present to a calling subscriber a list of the available services. The intelligent network (IN) is not a separate network but, rather, an assemblage of devices and components and programming integrated with a normal telephone network and implemented to realize additional call features such, for example, as call transfer, hold for consultation, call waiting, etc. The desired service is ordered by the subscriber from a predetermined service address, which is preferably a telephone number corresponding to the service but which may alternatively be any type of address designation capable of routing the subscriber's call or communication or request to the desired service, that the customer utilizes to set up a connection by telephone. The call corresponding to the order or request is transmitted to the intelligent network where, based on the order, the actions required to provide the service are carried out and/or the performances associated with the service are transmitted back to the terminal device.

In accordance with the invention, a connection is set up between the user's terminal device and the intelligent peripheral and, using the terminal device, a particular service that is to be transmitted to the terminal device—as for example in the form of a short message—is selected in the intelligent peripheral. After the resulting or ensuing transmission of the service, an assessment request based on the selected service is delivered from the intelligent peripheral to the service control point, and an event-based bill for the customer—based on the assessment requests sent by the peripheral—is generated. In a preferred implementation, to generate the bill a request to form a ticket based on the assessment request is sent from the service control point to the service switching point and the tickets thus formed are sent to a billing system, at which an event-based bill is produced by carrying out predetermined actions. The assessment request and, generally also the ticket, preferably contain information identifying the terminal device, such as the A-subscriber number, and accurate data relating to the service that has been ordered and for which the customer is to be charged on the basis of the order.

In a preferred implementation of the invention, the telecommunication network includes a gateway server for further transmission of the service. In such an implementation, an acknowledgement of the service being transmitted is preferably received from the gateway server, the acknowledgement thus confirming that the terminal device has received the service and initiating the generation of a bill by transmission of an assessment request from the service control point. Generally, the service provider supplies the teleoperator maintaining the telecommunication network and the equipment required for providing the service with information relating to the billing principles or tariff schedule, and this information is stored in the teleoperator's billing system.

In a further preferred embodiment of the invention, the services are addititionally transmitted from the gateway server to a short-message service center or a corresponding device or location, from which they are to be transmitted to the terminal device. Alternatively, the services can also be transmitted directly from the intelligent peripheral to the terminal device. In the most preferred forms of the invention, the terminal device is a mobile station, an ISDN system subscription or a like digital receiver.

As compared with prior art arrangements, the present invention advantageously allows billing for services provided via a telecommunication network to be implemented on an event-based, rather than a call-based, principle. A further advantage of the invention is that it makes it unnecessary to reserve a separate intelligent network number for each differently priced service, thus accommodating easier provision of services to consumers.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

DETAILED DESCRIPTION OF THE CURRENTLY PREFERRED EMBODIMENTS

Figure 1:
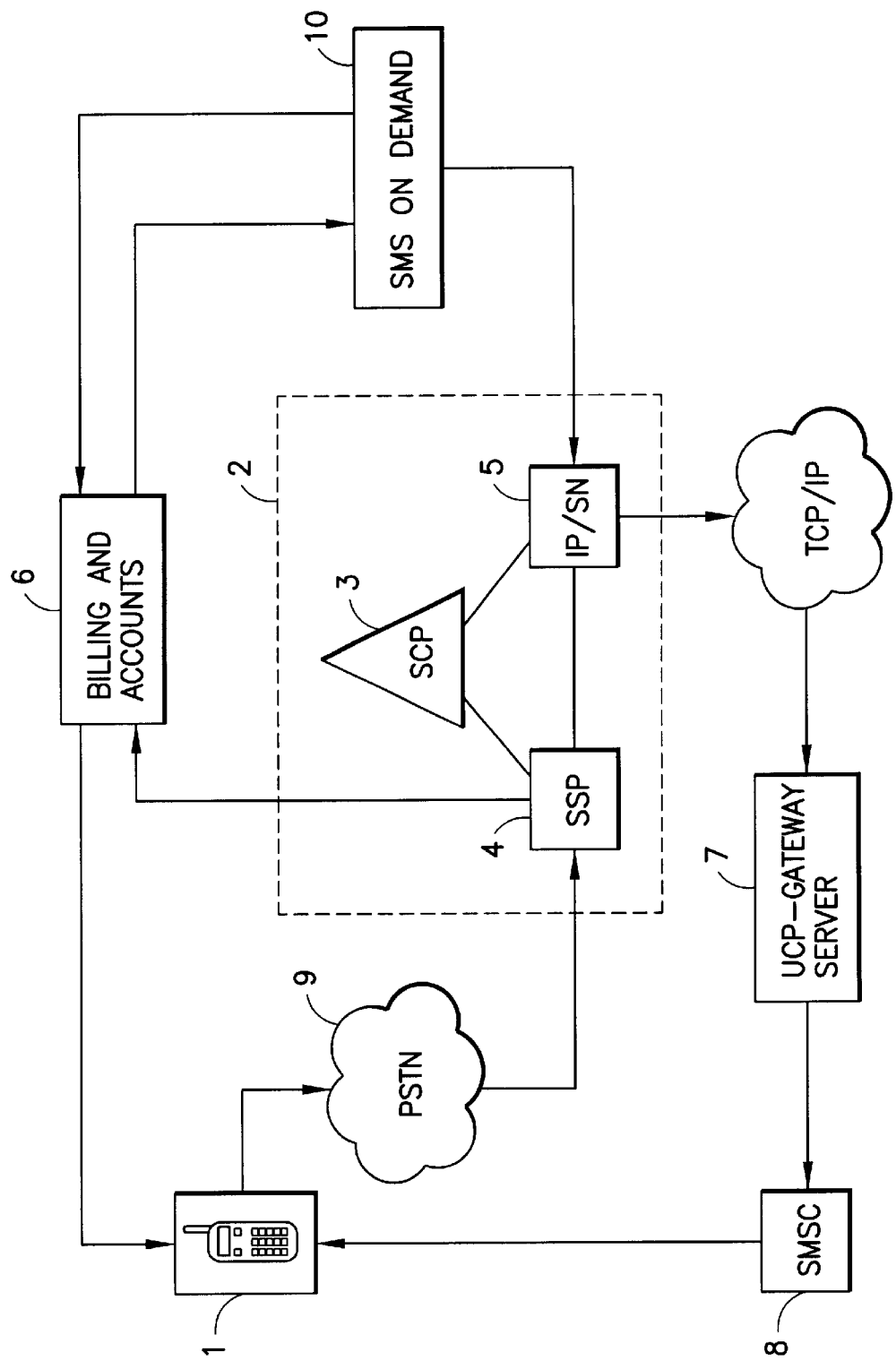
FIG. 1 is a block diagram of a telecommunication system implementing and suitable for use in the practice of the present invention.

The telecommunication system shown in FIG. 1 includes a terminal device 1 which, in this implementation disclosed by way of illustrative and currently preferred example, is a GSM mobile station, such as a GSM wireless telephone, conventionally or otherwise provided with features operative for the reception and transmission of text messages and other data transmissions. The GSM mobile station 1 communicates via a mobile communication network (not shown) with the public switched telephone network (PSTN) 9 and, through the PSTN 9, with an intelligent network 2 that preferably provides an assemblage of devices or components and the like that functions "on top" of the telephone network 9 to accommodate the addition of auxiliary features to calls. The intelligent network 2 includes a service switching point 4 that may for example be a digital group switch of well known construction, and a service control point 3 that is connected to the group switch 4 to control the switch 4. The intelligent network additionally includes a peripheral 5, which in this example is an IBM DirectTalk/6000 apparatus, for providing one or more predetermined services to remotely-located users of the network such, for example, via mobile station 1.

The system presented in FIG. 1 further includes a gateway server 7, which is connected to the intelligent peripheral 5 using the TCP/IP protocol. The gateway server additionally communicates with a short message switching center 8, designed specifically for the transmission of short message in the mobile communication network. Also shown diagrammatically in FIG. 1 are the components performing the actual billing operations, i.e. a billing system 6, which is preferably managed by the teleoperator, and a service provider 'SMS On Demand' server 10. In FIG. 1, the billing system 9 and the service provider 10 are interlinked by a two-way or bidirectional connection to accommodate the transmission of messages in both directions therebetween. Thus, from the billing system, accounting information concerning the services charged for are sent to the service provider; from the service provider, at least information relating to the billing principles or tariffs, such as service prices or costs, is sent to the billing system for storage.

Figure 2:
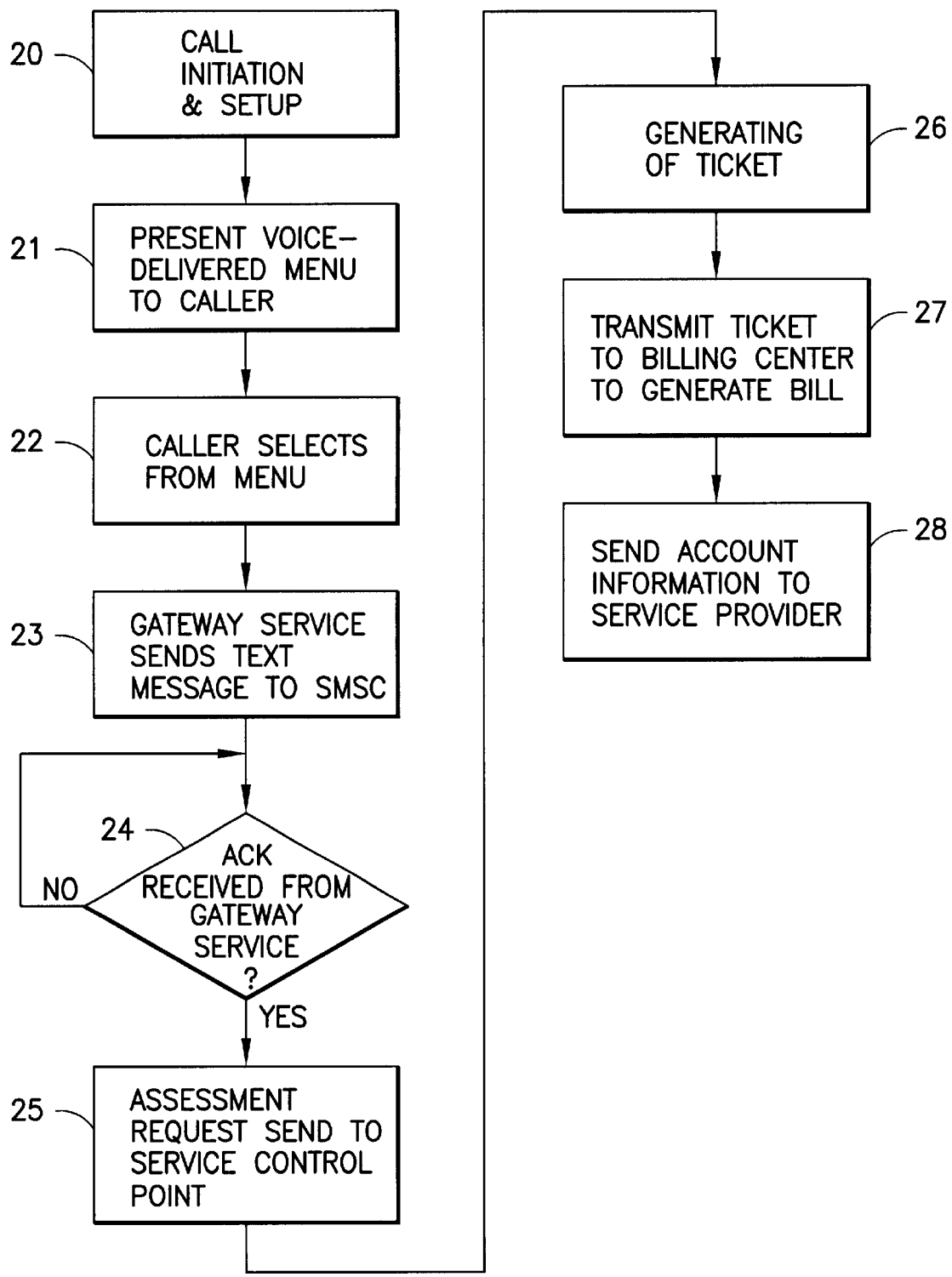
FIG. 2 is a flow chart of a method implemented in accordance with the invention.

An illustrative example of the procedures and operation of the present invention, as applied to the ordering and transmission of short-message service delivered services using the telecommunication system shown in FIG. 1 of the drawing, will now be presented with reference to FIG. 2 to assist and enhance a full understanding and appreciation of the invention. A person who wants to order a service, or in this case the customer using the GSM telephone 1, initiates a call from the telephone 1 to a particular service number (step 20). From the service number, the call is directed by the service control point 3 to the intelligent peripheral 5, where a service menu in the form of a voice-delivered menu is presented to the caller (step 21). In accordance with the voice menu, the subscriber selects the information that he or she wishes to purchase and receive on his or her terminal device as a text message (step 22). Next, the intelligent peripheral 5 sends a text message addressed to the A-subscriber number via the gateway server 7 to the short message switching center SMSC 8 (step 23), from which it is to be further transmitted to the subscriber's terminal device. Upon receipt of an acknowledgement from gateway server 7 (step 24), the intelligent peripheral 5 transmits an assessment request to the service control point (step 25). After ordering the service the customer may select another service from the voice-delivered menu or close the telephone 1, in which case the call is disconnected. Based on the assessment request, the service control point generates a ticket containing information regarding the A-subscriber number and the contents of the SMS message (step 26). The ticket may additionally include other information, such for example as data indicating the duration of the call. Finally, all of this information is transmitted to the teleoperator's billing system 6, from which a bill is generated for the subscriber (step 27) and corresponding account information is sent to the service provider 10 (step 28).

The signaling operations between the various system components, as well as the billing procedure, are themselves well known in telephony. By way of example, signaling between the components of the intelligent network 2 can be implemented using SS7/TUP (Signaling System No. 7/Telephone User Part) or SS7/ISUP (Signaling System No. 7/Integrated Services Digital Network User Part) procedures. It is further possible to use ETSI CorelNap in signaling between the SSP 4 and SCP 3. The signaling between the SCP 3 and the IP/SN 5 may for example be ETSI CorelNAP, which uses the return value of the Prompt And Collect User Information operation to transmit the desired assessment request from the IP/SN 5 to the SCP 3.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for implementing event-based billing for services delivered to a terminal device of a user via a telecommunication network to which the terminal device is connected, the telecommunication network comprising a billing system and an intelligent network that includes a service control point, a service switching point and an intelligent peripheral, said method comprising the steps of:

setting up a connection, via the telecommunication network, between the terminal device and the intelligent peripheral in response to user-initiated action at the terminal device to effect the connection to a predetermined service address;

selecting by the user, using the terminal device and over the connection set up between the terminal device and the intelligent peripheral, of one of a plurality of services available from the intelligent peripheral to thereby order by the user the selected service for delivery to the terminal device of the user;

transmitting, from the intelligent peripheral to the service control point, an assessment request for the service selected by the user;

transmitting, from the service control point to the service switching point in response to receipt by the service control point of the assessment request, a request to generate a ticket based on the assessment request;

transmitting, to the billing system from the service switching point, a ticket generated by the service switching point in response to receipt of the ticket generating request from the service control point; and producing, at the billing system by carrying out predetermined actions, an event-based bill for the user based on the ticket generated by the service switching point and identifying the selected service ordered by the user and delivered to the terminal device of the user;

wherein the telecommunication network further comprises a gateway server for further transmission of the selected service from the gateway server to a short-message switching center for subsequent transmission to the terminal device of the user.

2. A method in accordance with claim 1, wherein the ticket contains information relating to the selected service delivered to the terminal device and a code identifying the terminal device.

3. A method in accordance with claim 2, wherein the code comprises an A-subscriber number of the terminal device.

4. A method in accordance with claim 1, wherein the telecommunication network further comprises a gateway server for further transmission of the selected service, said method further comprising the step of transmitting, from the gateway server to the intelligent peripheral, an acknowledgement of transmission of the selected service by the gateway server, and wherein the assessment request is transmitted by the intelligent peripheral in response to receipt by the intelligent peripheral of the acknowledgement of transmission.

5. A method in accordance with claim 1, wherein the selected service is a short-message communication service.

6. A method in accordance with claim 1, wherein service charge tariff information for the selected service is stored in the billing system.

7. A method in accordance with claim 1, further comprising the steps of transmitting the selected service, in response to the order by the user, from the intelligent peripheral directly to the terminal device of the user.

8. A method in accordance with claim 1, wherein the terminal device comprises one of a mobile station, an ISDN system subscription and a digital receiver.

* * * * *